United States Patent
Kashino et al.

(10) Patent No.: US 6,905,794 B2
(45) Date of Patent: Jun. 14, 2005

(54) AIR-HYDROGEN BATTERY

(75) Inventors: Hiroshi Kashino, Yawara-mura (JP); Yasuo Arishima, Yawara-mura (JP); Shinsuke Shibata, Yawara-mura (JP); Gun Seki, Yawara-mura (JP); Ryo Nagai, Yawara-mura (JP)

(73) Assignee: Hitachi Maxell, Ltd., Osaka (JP)

( * ) Notice: Subject to any disclaimer, the term of this patent is extended or adjusted under 35 U.S.C. 154(b) by 261 days.

(21) Appl. No.: 10/240,553

(22) PCT Filed: Aug. 16, 2001

(86) PCT No.: PCT/JP01/07070

§ 371 (c)(1), (2), (4) Date: Oct. 1, 2002

(87) PCT Pub. No.: WO02/17428

PCT Pub. Date: Feb. 28, 2002

(65) Prior Publication Data

US 2003/0143457 A1 Jul. 31, 2003

(30) Foreign Application Priority Data

| | | |
|---|---|---|
| Aug. 22, 2000 | (JP) | 2000-250550 |
| Oct. 2, 2000 | (JP) | 2000-301813 |
| Nov. 6, 2000 | (JP) | 2000-337071 |
| Dec. 14, 2000 | (JP) | 2000-379576 |
| Mar. 29, 2001 | (JP) | 2001-95389 |

(51) Int. Cl.$^7$ .................. H01M 12/08; H01M 2/16; H01M 4/86; H01M 4/96

(52) U.S. Cl. .................. 429/137; 429/42; 429/44; 429/217; 429/218.2; 420/900

(58) Field of Search .................. 429/137, 42, 44, 429/217, 218.2

(56) References Cited

U.S. PATENT DOCUMENTS

| | | | |
|---|---|---|---|
| 5,565,284 A | 10/1996 | Koga et al. | 429/218 |
| 5,746,917 A | 5/1998 | Altmeier | 210/500.37 |

FOREIGN PATENT DOCUMENTS

| | | | | |
|---|---|---|---|---|
| JP | 4-192271 | 7/1992 | | |
| JP | 5-242906 | 9/1993 | | |
| JP | 05-242906 | * 9/1993 | ............ | H01M/8/18 |
| JP | 5-275108 | 10/1993 | | |
| JP | 5-290873 | 11/1993 | | |

(Continued)

OTHER PUBLICATIONS

Patent Abstracts of Japan Publication No. 05242906A; published Sep. 21, 1993 (1 page).

(Continued)

*Primary Examiner*—Carol Chaney
*Assistant Examiner*—Angela J. Martin
(74) *Attorney, Agent, or Firm*—Osha & May L.L.P.

(57) ABSTRACT

An air-hydrogen battery with high energy density and satisfactory cycle characteristics is provided.

The air-hydrogen battery includes: a positive electrode made of an air electrode; a negative electrode provided with a hydrogen-absorbing alloy; and a cation-exchange film or an anion-exchange film formed as an electrolyte between the positive electrode and the negative electrode, wherein a periphery of the hydrogen-absorbing alloy of the negative electrode is covered with an anion-exchange resin, whereby the contact area between the anion-exchange resin that functions as an electrolyte and the hydrogen-absorbing alloy is increased, and the utilization factor and resistance to corrosion of the hydrogen-absorbing alloy are enhanced.

14 Claims, 2 Drawing Sheets

FOREIGN PATENT DOCUMENTS

| JP | 6-223887 | 8/1994 |
| --- | --- | --- |
| JP | 6-243896 | 9/1994 |
| JP | 7-256107 | 10/1995 |
| JP | 7-282861 | 10/1995 |
| JP | 9-501722 | 2/1997 |
| JP | 9-67546 | 3/1997 |
| JP | 10-189003 | 7/1998 |
| JP | 10-270052 | 10/1998 |
| JP | 2001-176564 | 6/2001 |
| JP | 2001-266960 | 9/2001 |

OTHER PUBLICATIONS

Patent Abstracts of Japan Publication No. 10189003A; published Jul. 21, 1998 (1 page).

Patent Abstracts of Japan Publication No. 07256107A; published Oct. 9, 1995 (1 page).

Patent Abstracts of Japan Publication No. 04192271A; published Jul. 10, 1992 (1 page).

Patent Abstracts of Japan No. 10270052A; published Oct. 9, 1998 (1 page).

Patent Abstracts of Japan No. 05275108A; published Oct. 22, 1993 (1 page).

Patent Abstracts of Japan Publication No. 06223887A; published Aug. 12, 1994 (1 page).

Patent Abstracts of Japan Publication No. 05290873A; published Nov. 5, 1993 (1 page).

Patent Abstracts of Japan Publication No. 07282861A; published Oct. 27, 1995 (1 page).

Patent Abstracts of Japan Publication No. 2001-266960; published Sep. 28, 2001 (1 page).

Patent Abstracts of Japan Publication No. 2001-176564; published Jun. 29, 2001 (1 page).

Patent Abstracts of Japan Publication No. 09067546A; published Mar. 11, 1997 (1 page).

* cited by examiner

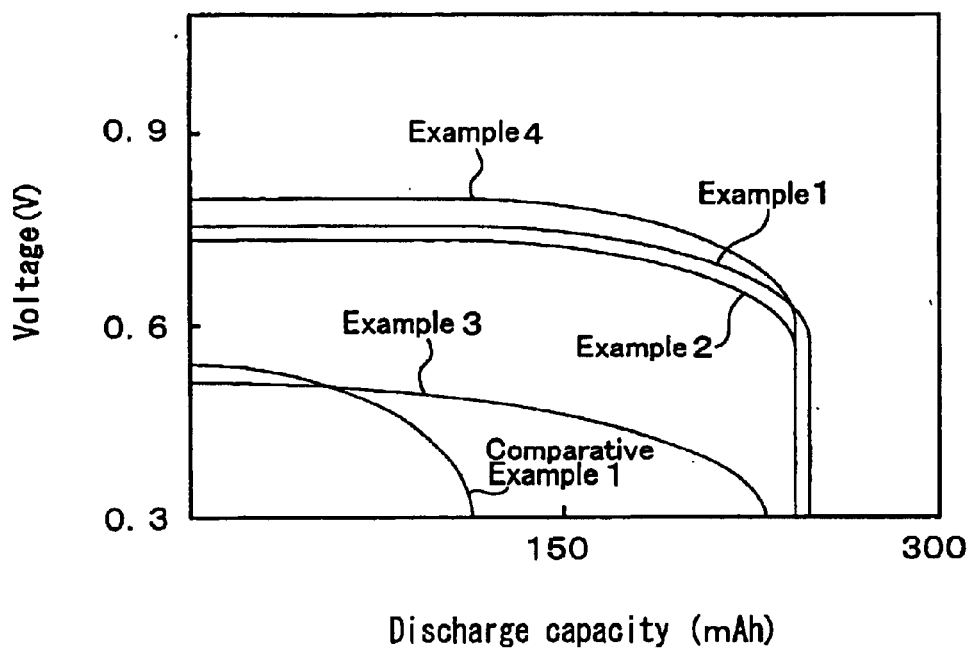
F I G. 2
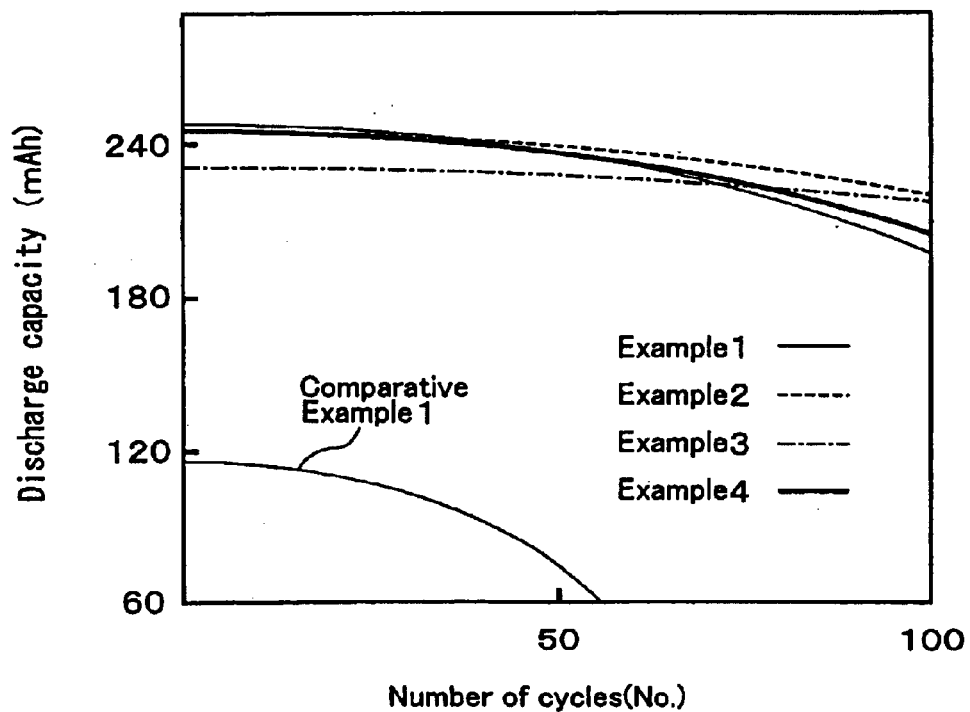
F I G. 3

AIR-HYDROGEN BATTERY

TECHNICAL FIELD

The present invention relates to an air-hydrogen battery using an air electrode as a positive electrode, a cation-exchange resin or an anion-exchange resin as an electrolyte, and a hydrogen-absorbing alloy as a working material for a negative electrode.

BACKGROUND ART

Along with the recent widespread use of cordless equipment such as personal computers and mobile phones, there is an increasing demand for miniaturization and higher capacity of a secondary battery that functions as a power supply for such equipment. An example of batteries satisfying the demand includes an air battery. The air battery utilizes oxygen in the air as an active material for a positive electrode, and allows most of the volume thereof to be used for a negative electrode. Therefore, the air battery is considered to be preferable for increasing the density of energy.

JP 5(1993)-242906 A and JP 5(1993)-275108 A have proposed batteries using an air electrode as a positive electrode, a hydrogen-absorbing alloy as a working material for a negative electrode, and an ion-exchange film as an electrolyte. In such batteries, the filling volume of a negative electrode can be increased compared with a conventional nickel-metal hydride battery, so that higher capacity is expected.

However, in the case where a cation-exchange resin is used as an electrolyte, protons function as ion conductors, which puts the entire cation-exchange resin in an acidic atmosphere. As a result, a hydrogen-absorbing alloy may be corroded at a site where the cation-exchange resin comes into contact with the hydrogen-absorbing alloy. On the other hand, in the case where an anion-exchange resin is used as an electrolyte, it is required to keep a path for conducting ions up to the inside of a negative electrode so that the entire hydrogen-absorbing alloy can participate in a reaction.

In order to eliminate the influence of carbon dioxide in the air, JP 5(1993)-275108 A recommends using a cation-exchange film as an electrolyte to be disposed between a positive electrode and a negative electrode, and discloses that an ion-exchange resin is allowed to be present in a hydrogen-absorbing alloy layer of a negative electrode. However, JP 5(1993)-275108 A merely describes an example in which a negative electrode is impregnated with a liquid cation-exchange resin, and does not consider the problem of corrosion of a hydrogen-absorbing alloy. Furthermore, JP 5(1993)-275108 A does not describe what kind of anion-exchange resin can be used in the case where an anion-exchange resin is used as an ion-exchange resin of the hydrogen-absorbing alloy layer. Even if general anion-exchange resin powder is dispersed together with a hydrogen-absorbing alloy, and allowed to be present in the hydrogen-absorbing alloy layer, it is difficult for ions to move between the anion-exchange resin powders and between the hydrogen-absorbing alloy and the anion-exchange resin, which makes it difficult to use the entire hydrogen-absorbing alloy for a charging/discharging reaction.

Furthermore, in JP 5(1993)-242906 A, an alkaline electrolyte is used for keeping a path for conducting ions in a negative electrode, which causes a safety problem such as leakage in an unsealed air electrode. Furthermore, as in a nickel-metal hydride battery, the problem of corrosion of a hydrogen-absorbing alloy caused by an alkaline electrolyte is not solved. Furthermore, in JP 5(1993)-242906 A, mechanical charging that uses filling of hydrogen gas is adopted instead of electrical charging, which may cause trouble in operability of a user.

Therefore, the present invention overcomes the above-mentioned problem in the prior art, and its object is to provide an air-hydrogen battery with high energy density capable of preventing corrosion of a hydrogen-absorbing alloy and improving the utilization factor of the hydrogen-absorbing alloy in a charging/discharging reaction.

DISCLOSURE OF INVENTION

The present invention relates to an air-hydrogen battery including: a positive electrode made of an air electrode; a negative electrode provided with a hydrogen-absorbing alloy; and a cation-exchange film or an anion-exchange film between the positive electrode and the negative electrode, wherein a periphery of the hydrogen-absorbing alloy of the negative electrode is covered with an anion-exchange resin, thereby solving the above-mentioned problem.

More specifically, according to the present invention, the contact area between the anion-exchange resin having a function as an electrolyte and the hydrogen-absorbing alloy is increased substantially, and a continuous ion-conductive network is formed inside the negative electrode. Therefore, the utilization factor of the hydrogen-absorbing alloy is increased, whereby a battery with high energy density can be obtained. Furthermore, even in the case where an electrolyte to be interposed between the positive electrode and the negative electrode is a cation-exchange film, the hydrogen-absorbing alloy of the negative electrode is protected by the anion-exchange resin, so that corrosion of the hydrogen-absorbing alloy is suppressed.

The above-mentioned coating of the hydrogen-absorbing alloy with the anion-exchange resin can be conducted as follows. For example, as the anion-exchange resin materials, a polymer having a reactive halogen-containing functional group such as polyepichlorohydrin, tertiary amine such as 1,4-diazabicyclo-(2,2,2)-octane, and an inactive polymer such as polyacrylonitrile are used, and these materials are dissolved in an organic solvent such as dimethylformamide. Then, a negative electrode is impregnated with the liquid anion-exchange resin thus obtained, followed by heating, whereby the hydrogen-absorbing alloy can be coated with the anion-exchange resin.

The above-mentioned anion-exchange resin materials have been known from JP 9(1997)-501722 A. However, the inventors of the present invention found that these materials are very effective for solving the above-mentioned problem.

BRIEF DESCRIPTION OF DRAWINGS

FIG. 2 is a graph showing discharge characteristics of air-hydrogen batteries of Examples 1 to 4, and an air-hydrogen battery of Comparative Example 1.

FIG. 3 is a graph showing cycle characteristics of air-hydrogen batteries of Examples 1 to 4, and an air-hydrogen battery of Comparative Example 1

BEST MODE FOR CARRYING OUT THE INVENTION

Figure 1:
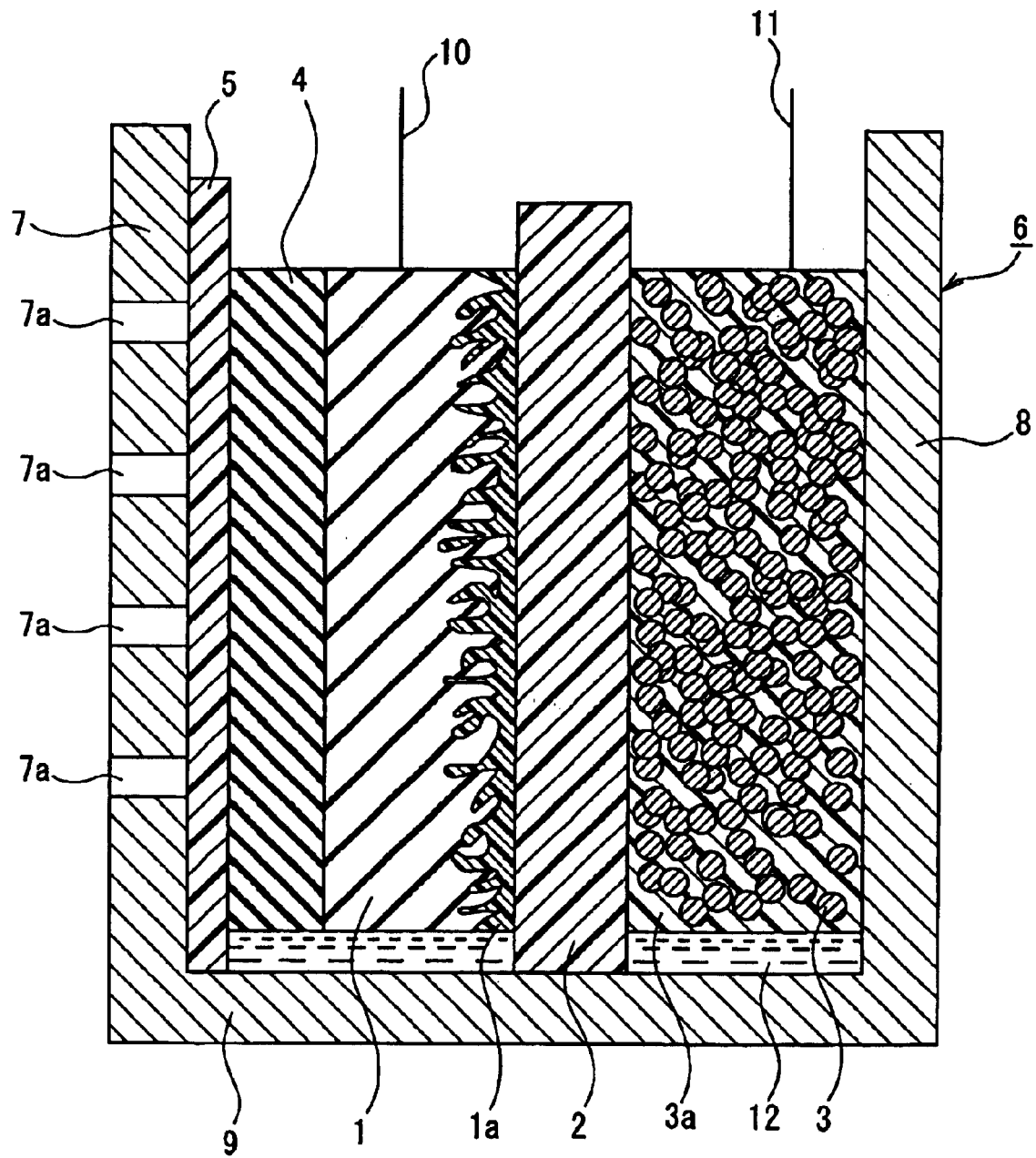
FIG. 1 is a cross-sectional view schematically showing an example of an air-hydrogen battery according to the present invention.

According to the present invention, there is no particular limit to an air electrode of a positive electrode, and conventionally known electrodes can be used. However, when catalysts as described below are used for an air electrode, batteries with more excellent characteristics can be obtained, which is preferable.

An example of a catalyst for an air electrode includes metal powder plated with catalytic elements. When such metal powder is used as a catalyst of an air electrode, the catalytic elements do not peel off from the surface of the metal powder even after charging/discharging for a long period of time, and polarization also is suppressed. Therefore, an air-hydrogen battery with a long life and high capacity, which is excellent in cycle characteristics, can be provided. Herein, examples of the metal powder include nickel, chromium, tungsten, tantalum, titanium, lead, niobium, hafnium, molybdenum, tin, and the like. In particular, nickel powder, tungsten powder, tantalum powder, titanium powder, niobium powder, molybdenum powder, and the like are preferable. Furthermore, as the catalytic elements, for example, silver, ruthenium, rhodium, palladium, iridium, platinum, gold, osmium, and the like can be used. In particular, silver, ruthenium, rhodium, palladium, iridium, platinum, gold, and the like are preferable.

Furthermore, when the surface of the metal powder is provided with a fluorine resin as well as being plated with the catalytic elements, the metal powder has satisfactory water-repellency. This prevents water generated during charging/discharging from remaining in an air electrode to close a gas path, and is effective for improving charge/discharge characteristics and cycle characteristics. As the fluorine resin, polytetrafluoroethylene preferably is used in terms of durability and water-repellency.

In order to allow a fluorine resin to adhere to the surface of the metal powder, a method for bringing the metal powder into contact with a dispersion of a fluorine resin is used.

As the other catalysts for an air electrode, a carbon material provided with water-repellency by fluorination preferably is used. By introducing a C-F coupling into the surface of a carbon material, water-repellency is provided, and a three-phase interface in an air electrode and a gas path are kept appropriately. Therefore, initial polarization performance is improved. Wetting of a catalyst for an air electrode by water generated in the course of a reaction involved in charging/discharging is suppressed. This suppresses degradation of performance involved in the progression of a cycle, whereby the cycle characteristics are enhanced.

Fluorination for introducing a C-F coupling into a carbon material can be conducted, for example, by disposing a carbon material in a reaction tube, and introducing fluorine ($F_2$) gas thereto at a high temperature.

Examples of the above-mentioned carbon material include black lead, carbon black, charcoal, activated carbon, and the like. In particular, due to a large specific surface, charcoal preferably is used.

In the case where the carbon material is combined with other catalysts, for example, rare-earth oxides preferably are used. Examples of the rare-earth oxides include $La_{0.6}Ca_{0.4}CoO_3$, $LaCoO_3$, $LaMnO_3$, $La_{0.6}Ca_{0.4}MnO_3$, $La_{0.6}Sr_{0.4}CoO_3$, $La_{0.6}Sr_{0.4}MnO_3$, and the like. By allowing these rare-earth oxides to be present together, the catalytic ability of an air electrode can be enhanced.

On the other hand, examples of a hydrogen-absorbing alloy used as a working material for a negative electrode include an $AB_5$ hydrogen-absorbing alloy such as $LaNi_5$, an $AB_2$ hydrogen-absorbing alloy such as $ZnMn_2$ or a substitution product thereof, a magnesium-type $A_2B$ hydrogen absorbing alloy such as $Mg_2Ni$ or a substitution product thereof, a solid solution V—Ni hydrogen-absorbing alloy, and the like. In particular, an Mm (misch metal) alloy, which is used in a conventional nickel-metal hydride battery and is a kind of the $AB_5$ hydrogen absorbing alloy, preferably is used.

Furthermore, it is preferable that a negative electrode containing the above hydrogen-absorbing alloys contains a triazine thiol derivative. The triazine thiol derivative functions as an adhesive between an anion-exchange resin and a hydrogen-absorbing alloy. Therefore, even if a volume change involved in a charging/discharging cycle is caused in a negative electrode, a bonding state between the hydrogen-absorbing alloy and the anion-exchange resin can be kept satisfactorily.

The triazine thiol derivative represented by the following General Formula (1) preferably is used.

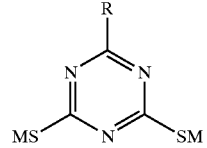

General Formula (1)

where R represents —OR', —SR', —NHR' or —N(R')$_2$; R' represents H, an alkyl group, an alkenyl group, a phenyl group, a phenylalkyl group, an alkylphenyl group, or a cycloalkyl group; and M represents H, Na, Li, K, ½Mg, ½Ba, ½Ca, aliphatic primary, secondary or tertiary amine, a quaternary ammonium salt or a phophonium salt.

Examples of the triazine thiol derivatives include 1,3,5-triazine-2,4,6-trithiol, 1,3,5-triazine-2,4,6-trithiol.monosodium,
1,3,5-triazine-2,4,6-trithiol.monopotassium,
1,3,5-triazine-2,4,6-trithiol.monoethanolamine,
1,3,5-triazine-2,4,6-trithiol.diethanolamine,
1,3,5-triazine-2,4,6-trithiol.triethylamine,
1,3,5-triazine-2,4,6-trithiol.octylamine,
1,3,5-triazine-2,4,6-trithiol.tetrabutylammonium salt,
1,3,5-triazine-2,4,6-trithiol.bis(tetrabutylammonium salt),
6-anilino-1,3,5-triazine-2,4-dithiol,
6-anilino-1,3,5-triazine-2,4-dithiol.monosodium,
6-anilino-1,3,5-triazine-2,4-dithiol.triethylamine,
6-dibutylamino-1,3,5-triazine-2,4-dithiol,
6-butylamino-1,3,5-triazine-2,4-dithiol.monosodium,
6-dibutylamino-1,3,5-triazine-2,4-dithiol.monoethanolamine,
6-dibutylamino-1,3,5-triazine-2,4-dithiol.ethylamine,
6-dibutylamino-1,3,5-triazine-2,4-dithiol.triethylamine,
6-dibutylamino-1,3,5-triazine-2,4-dithiol.butylamine,
6-dibutylamino-1,3,5-triazine-2,4-dithiol.tetrabutylammonium salt,
6-dibutylamino-1,3,5-triazine-2,4-dithiol.tetrabutylphosphonium salt,
6-diallylamino-1,3,5-triazine-2,4-dithiol,
6-diallylamino-1,3,5-triazine-2,4-dithiol.monosodium,
6-diallylamino-1,3,5-triazine-2,4-dithiol.monoethanolamine,
6-diallylamino-1,3,5-triazine-2,4-dithiol.butylamine,
6-diallylamino-1,3,5-triazine-2,4-dithiol.ethylendiamine,
6-diallylamino-1,3,5-triazine-2,4-dithiol.ethylenetriamine,
6-octylamino-1,3,5-triazine-2,4-dithiol,
6-octylamino-1,3,5-triazine-2,4-dithiol.monosodium, and the like.

The content of the triazine thiol derivative in a negative electrode preferably is 0.0001 to 1% by mass with respect to a hydrogen-absorbing alloy (0.0001 to 1 parts by mass of triazine thiol derivative based on 100 parts by mass of hydrogen-absorbing alloy), and more preferably is 0.001 to 0.5% by mass. More specifically, by setting the content of the triazine thiol derivative in the above range, a hydrogen-absorbing alloy is brought into sufficient contact with an anion-exchange resin to enhance the utilization factor of the hydrogen-absorbing alloy and improve cycle characteristics. Furthermore, the expression of an electron insulating layer by an excessive triazine thiol derivative is suppressed, whereby an electric contact can be kept appropriately.

In the air-hydrogen battery of the present invention, a cation-exchange film or an anion-exchange film is used as an electrolyte between a positive electrode and a negative electrode. Examples of the cation-exchange film include those which have a cation-exchange ability using a fluorine resin or a hydrocarbon resin as a skeleton, commercially available as trade names such as "Nafion" (produced by Dupont), "Flemion" (produced by Asahi Glass Co., Ltd.), and "Neosepta CM-1" (produced by Tokuyama Corp.). Furthermore, examples of the anion-exchange film include those which have an anion-exchange ability using a fluorine resin and a hydrocarbon resin as a skeleton, commercially available as trade names such as "TOSFLEX" (produced by Tosoh Corporation) and "Neosepta AHA" (produced by Tokuyama Corp.).

According to the present invention, in order to cover the periphery of the hydrogen-absorbing alloy with an anion-exchange resin, for example, the following method preferably is used. More specifically, a polymer having a reactive halogen-containing functional group, tertiary amine, and an inactive polymer are used as anion-exchange resin materials, and these materials are dissolved in an organic solvent to obtain a liquid anion-exchange resin. A conductive substrate of a negative electrode is coated or filled with the liquid anion-exchange resin together with a hydrogen-absorbing alloy, or the negative electrode having a hydrogen-absorbing alloy is impregnated with the liquid anion-exchange resin, followed by heating at 30° C. to 200° C., whereby tertiary amine is converted into quarternally amine by the polymer having a reactive halogen-containing functional group to form an anion-exchange resin coating on the periphery of the hydrogen-absorbing alloy. Then, by evaporating an organic solvent, a negative electrode having a hydrogen-absorbing alloy covered with an anion-exchange resin can be obtained.

As the above-mentioned polymer having a reactive halogen-containing functional group, for example, polyepichlorohydrin, and the like are used. As the tertiary amine, for example, 1,4-diazabicyclo-(2,2,2)-octane, and the like are used. As the inactive polymer, for example, polyacrylonitrile and the like are used. There is no particular limit to a ratio among the polymer having a reactive halogen-containing functional group, the tertiary amine, and the inactive polymer. For example, 40 to 65% by mass of the polymer having a reactive halogen-containing functional group, 30 to 40% by mass of the tertiary amine, and 0 to 30% by mass of the inactive polymer are appropriate.

Furthermore, the anion-exchange resin may be contained in a positive electrode as well as a negative electrode. Particularly, in the case where an anion-exchange film is formed as an electrolyte between a positive electrode and a negative electrode, the anion-exchange resin is contained in the positive electrode, whereby a path for conducting ions can be formed exactly between the positive electrode and the negative electrode. Therefore, an air-hydrogen battery excellent in charge/discharge characteristics and cycle characteristics can be constituted.

Next, the present invention will be described by way of illustrative examples. It should be noted that the present invention is not limited thereto.

EXAMPLE 1

First, production of a negative electrode will be described. One gram of polyepichlorohydrin as a reactive halogen-containing functional group was dissolved in 10 g of N,N-dimethylformamide to obtain a solution. Then, 1 g of 1,4-diazabicyclo-(2,2,2)-octane as tertiary amine was added to the solution to effect a reaction at 80° C. for 1 hour. The reaction solution thus obtained was mixed with a solution in which 0.5 g of polyacrylonitrile as the inactive polymer was dissolved in 5 g of N,N-dimethylformamide to prepare a liquid anion-exchange resin.

Then, 10 g of a hydrogen-absorbing alloy represented by $MmNi_{3.48}Co_{0.74}Mn_{0.4}Al_{0.3}$ (herein, Mm is misch metal containing 33% by mass of La, 47% by mass of Ce, 5% by mass of Pr, and 15% by mass of Nd) was mixed with 1.7 g of the above-mentioned liquid anion-exchange resin to prepare a negative electrode mixture-containing paste. A conductive substrate made of a nickel foam with a pore ratio of 97% was coated with the negative electrode mixture-containing paste, followed by drying at 65° C. for 1 hour, whereby a negative electrode having a hydrogen-absorbing alloy covered with an anion-exchange resin was produced.

An air electrode constituting a positive electrode was produced as follows. A catalyst made of carbon black powder carrying 20% by mass of platinum was mixed with an aqueous dispersion of polytetrafluoroethylene so that the mass ratio therebetween became 80:20 to obtain a paste. A carbon fiber plate electrode support was coated with the paste thus obtained, followed by drying, whereby a positive electrode supported by the carbon fiber plate electrode support was produced.

Then, the liquid anion-exchange resin was dropped to the negative electrode and the positive electrode, respectively, on sides facing an ion exchange resin film, in an amount of 30% by mass (dry mass) with respect to the respective electrode mixture masses. Then, the negative and positive electrodes were heated at 65° C. for 1 hour to allow the anion-exchange resin material to react with the positive and negative electrodes. Furthermore, a solvent (i.e., dimethylformamide) was removed, and the anion-exchange resin was allowed to fill air holes from the surface to the inside of the positive and negative electrodes. In the negative electrode, the electrode mixture mass refers to the mass of a negative electrode mixture (i.e., a mixture of a hydrogen-absorbing alloy and an anion-exchange resin) excluding a conductive substrate. In the positive electrode, the electrode mixture mass refers to the mass of a positive electrode mixture (i.e., a mixture of a catalyst for an air electrode and polytetrafluoroethylene) excluding a carbon fiber plate electrode support.

As an electrolyte to be interposed between the positive electrode and the negative electrode, an anion-exchange film "Neosepta AHA" produced by Tokuyama Corp. was used, which was obtained by forming a quaternary amine compound of a copolymer of styrene and divinylbenzene into a film. "Neosepta AHA" was interposed between the positive electrode and the negative electrode containing the above-mentioned anion-exchange resin. A polytetrafluoroethylene sheet was placed on the positive electrode. Under this condition, hot press was conducted at a temperature of 125° C. and a pressure of 25 MPa, whereby the positive and negative electrodes, and the electrolyte were integrated with each other.

The integrated electrode thus obtained was accommodated in a battery case, and distilled water was injected thereto to such a degree that the anion-exchange resin became sufficiently wet, whereby an air-hydrogen battery as shown in FIG. 1 was assembled.

Hereinafter, the air-hydrogen battery shown in FIG. 1 will be described. Reference numeral 1 denotes a positive electrode made of an air electrode. An inner portion of the positive electrode 1 facing an ion exchange film 2 is filled with an anion-exchange resin 1a. The ion-exchange film 2 is composed of "Neosepta AHA" that is an anion-exchange film, and is interposed between the positive electrode 1 and a negative electrode 3. The negative electrode 3 includes a hydrogen-absorbing alloy as a working material. The periphery of the hydrogen-absorbing alloy is covered with an anion-exchange resin 3a. On a side of the positive electrode 1 opposite to the ion-exchange film 2, a carbon fiber plate electrode support 4 for dispersing the air taken through pores 7a of a front wall 7 is disposed. Furthermore, a polyterafluoroethylene sheet 5 that does not pass a liquid but passes a gas is provided between the front wall 7 and the carbon fiber plate electrode support 4. The positive electrode 1, the ion-exchange film 2, the negative electrode 3, the carbon fiber plate electrode support 4, and the polytetrafluoroethylene sheet 5 are accommodated in a battery case 6 made of polypropylene (PP), composed of the front wall 7, a back wall 8, and a bottom wall 9. Thus, oxygen in the air can be taken into the positive electrode 1 through the pores 7a of the front wall 7 of the battery case 6. A positive terminal 10 is led out from the positive electrode 1, and a negative terminal 11 is led out from the negative electrode 3. Furthermore, distilled water 12 is injected into the battery case 6 to such a degree that the anion-exchange resin constituting the ion-exchange film 2, the anion-exchange resin 1a in the positive electrode 1, and the anion-exchange resin 3a in the negative electrode 3 become wet sufficiently.

EXAMPLE 2

First, 0.05 g of 6-dibutylamino-1,3,5-triazine-2,4-dithiol as a triazine thiol derivative was dissolved in 0.1 mol/dm$^3$ of an aqueous solution of potassium hydroxide (50 cm$^3$) to prepare a solution. Then, 10 g of the same hydrogen-absorbing alloy as that in Example 1 was added to the solution thus obtained, and the resultant mixture was stirred at 50° C. for 30 minutes. Thereafter, the mixture was filtered and washed, and placed in a glass container, followed by drying at 65° C. Using the hydrogen-absorbing alloy treated with 6-dibutylamino-1,3,5-triazine-2,4-dithiol, a negative electrode was produced in the same procedure as that in Example 1. The other configuration was set to be the same as that in Example 1, whereby an air-hydrogen battery was produced.

EXAMPLE 3

An air-hydrogen battery was produced by using an air electrode containing, as a catalyst, nickel powder that has polytetrafluoroethylene as fluorine resin together with silver plating on its surface. The detail thereof will be described below.

First, 2.158 g of nickel powder was placed in acetone, and degreased by ultrasonic washing for 10 minutes. Then, the nickel powder taken out from acetone was placed in a hydrochloric acid aqueous solution with a concentration of 10% by volume, and washed with an acid while stirring for 30 minutes. Thereafter, the nickel powder was washed with water until it became neutral. Thus, the nickel powder was pretreated.

The nickel powder was placed in 70 cm$^3$ of distilled water. Then, 0.889 g of a dispersion in which 60% by mass of polytetrafluoroethylene was dispersed in 2 cm$^3$ of ethanol was added to the nickel powder successively. After stirring for 5 minutes, the dispersion was dispersed ultrasonically for 10 minutes, whereby polytetrafluoroethylene was allowed to adhere to the surface of the nickel powder.

Furthermore, 30.05 g of ethylenediamine and 0.8494 g of silver nitrate were added to 1000 cm$^3$ of distilled water successively to prepare a plating bath.

While the plating bath was stirred, the nickel powder treated with the dispersion of polytetrafluoroethylene was soaked therein, whereby silver plating was conducted. The temperature of the plating bath was about 25° C., and the plating time was 8 hours. After the completion of the plating, the nickel powder was washed with water until it became neutral. Thereafter, the nickel powder was dried in an electric furnace at 150° C. for 3 hours, whereby nickel powder having polytetrafluoroethylene as well as silver plating on its surface was obtained. The thickness of plating was about 0.1 μm.

An air electrode was produced. First, 3 cm$^3$ of distilled water was added to 1.5 g of the above-mentioned nickel powder to obtain a paste. A nickel mesh placed in a frame made of stainless steel (thickness: 0.3 mm) was coated with the paste thus obtained. Then, the paste was drawn uniformly with a roller made of stainless steel. The frame made of stainless steel was removed, and thereafter, the resultant paste was pressed. The paste was heat-treated in an electric furnace under pressure. The heat treatment conditions were as follows. First, a temperature was increased to 230° C. in 1 hour, and kept at 230° C. for 30 minutes. Thereafter, the temperature was cooled naturally up to room temperature to obtain an air electrode. An air-hydrogen battery was produced in the same way as in Example 1, except that the air electrode was used as a positive electrode.

EXAMPLE 4

Using a carbon material into the surface of which a C-F coupling was introduced by fluorination and a rare-earth oxide, an air electrode was produced as follows. First, carbon black "VULCAN XC-72" produced by CABOT was fluorinated to obtain fluorinated carbon in which about 5% by mass of fluorine was introduced. Then, 0.25 g of the fluorinated carbon and 0.125 g of $La_{0.6}Ca_{0.4}CoO_3$ were added to 30 cm$^3$ of distilled water. The mixture was stirred for 10 minutes. Then, 0.18 g of polytetrafluoroethylene aqueous dispersion with a concentration of 60% by mass was added to the mixture, and stirred for 20 minutes. Then, 8 cm$^3$ of n-butanol was added to the resultant mixture, followed by stirring for 20 minutes. Then, the mixture was increased in temperature to 200° C., and stirred for 20 minutes. Thereafter, an aggregate was precipitated, and a supernatant was removed to obtain an air electrode catalytic paste.

A carbon fiber plate electrode support was coated with the paste thus obtained, followed by drying, whereby a positive electrode supported by the carbon fiber plate electrode support was produced. An air-hydrogen battery was produced in the same way as in Example 1, except that the above-mentioned positive electrode was used.

COMPARATIVE EXAMPLE 1

A negative electrode was produced as follows. The same hydrogen-absorbing alloy as that in Example 1 was mixed with an aqueous dispersion of polytetrafluoroethylene so that the mass ratio therebetween became 95:5 to obtain a paste. A conductive substrate made of a nickel foam having a pore ratio of 95% was filled with the paste thus obtained. The paste was dried and formed under pressure to produce a negative electrode. As an air electrode constituting a positive electrode, the same electrode as that in Example 1 was used.

An air-hydrogen battery was produced in the same way as in Example 1, except that dropping of a liquid anion-exchange resin to the sides of the negative and positive electrodes facing the ion-exchange film was not conducted.

FIG. 2 shows the results obtained by charging the air-hydrogen batteries of Examples 1 to 4 and Comparative Example 1 at a discharge current of 30 mA for 10 hours, and discharging them at a discharge current of 30 mA up to a cut-off voltage of 0.3 V. FIG. 3 shows the results obtained by measuring changes in discharge capacity when a charge/discharge cycle is conducted under the above-mentioned conditions.

It is apparent from FIG. 2 that the batteries of Examples 1 to 4 have discharge capacity larger than that of Comparative Example 1, and the battery of the present invention has energy density higher than that of conventional batteries.

Furthermore, as shown in FIG. 3, in the batteries of Examples 1 to 4, discharge capacity is maintained at a high level even if the number of cycles is increased. Thus, the battery of the present invention is excellent in cycle characteristics. This is because the utilization factor of a hydrogen-absorbing alloy is high, and corrosion of the hydrogen-absorbing alloy is suppressed.

INDUSTRIAL APPLICABILITY

As described above, according to the present invention, a hydrogen-absorbing alloy of a negative electrode is covered with an anion-exchange resin having a function as an electrolyte. Therefore, the contact area therebetween is increased substantially, the utilization factor of a working material such as the hydrogen-absorbing alloy is enhanced, and the energy density of an air-hydrogen battery can be increased.

Furthermore, since the hydrogen-absorbing alloy is covered with an anion-exchange resin, the hydrogen-absorbing alloy can be prevented from being corroded, and cycle characteristics of an air-hydrogen battery can be enhanced substantially.

What is claimed is:

1. An air-hydrogen battery comprising:
a positive electrode made of an air electrode;
a negative electrode including a hydrogen-absorbing alloy; and
a cation-exchange film or an anion-exchange film disposed between the positive electrode and the negative electrode,
wherein a periphery of the hydrogen-absorbing alloy of the negative electrode is covered with an anion-exchange resin such that an ion-conductive network is formed inside the negative electrode with the anion-exchange resin.

2. The air-hydrogen battery according to claim 1, wherein the negative electrode comprises a triazine thiol derivative.

3. The air-hydrogen battery according to claim 1, wherein the air electrode comprises an anion-exchange resin.

4. The air-hydrogen battery according to claim 1, wherein the air electrode comprises metal powder plated with catalytic elements.

5. The air-hydrogen battery according to claim 4, wherein the metal powder plated with catalytic elements comprises a fluorine resin.

6. The air-hydrogen battery according to claim 4, wherein the metal powder is selected from the group consisting of nickel, tungsten, tantalum, titanium, niobium, and molybdenum; and the catalytic elements are selected from the group consisting of silver, ruthenium, rhodium, palladium, iridium, platinum, and gold.

7. The air-hydrogen battery according to claim 1, wherein the air electrode comprises, as a catalyst, a carbon material whose surface is fluorinated.

8. The air-hydrogen battery according to claim 1, wherein the air electrode comprises, as a catalyst, a carbon material whose surface is fluorinated and a rare-earth oxide.

9. The air-hydrogen battery according to claim 1, wherein an anion-exchange resin is contained in the negative electrode, whereby the periphery of the hydrogen-absorbing alloy is covered with the anion-exchange resin.

10. The air-hydrogen battery according to claim 1, wherein a liquid anion-exchange resin is contained in the negative electrode, whereby a coating of the anion-exchange resin is formed on the hydrogen-absorbing alloy.

11. The air-hydrogen battery according to claim 2, wherein the air electrode comprises an anion-exchange resin.

12. The air-hydrogen battery according to claim 2, wherein the air electrode comprises, as a catalyst, a carbon material whose surface is fluorinated.

13. The air-hydrogen battery according to claim 2, wherein the air electrode comprises, as a catalyst, a carbon material whose surface is fluorinated and a rare-earth oxide.

14. The air-hydrogen battery according to claim 5, wherein the metal powder is selected from the group consisting of nickel, tungsten, tantalum, titanium, niobium, and molybdenum; and the catalytic elements are selected from the group consisting of silver, ruthenium, rhodium, palladium, iridium, platinum, and gold.

* * * * *